United States Patent
Todd (12)

(10) Patent No.: US 6,494,263 B2
(45) Date of Patent: *Dec. 17, 2002

(54) WELL DRILLING AND SERVICING FLUIDS AND METHODS OF REMOVING FILTER CAKE DEPOSITED THEREBY

(75) Inventor: Bradley L. Todd, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 72 days.

This patent is subject to a terminal disclaimer.

(21) Appl. No.: 09/756,961

(22) Filed: Jan. 9, 2001

(65) Prior Publication Data

US 2002/0036088 A1 Mar. 28, 2002

Related U.S. Application Data

(63) Continuation-in-part of application No. 09/629,959, filed on Aug. 1, 2000.

(51) Int. Cl.[7] .............................................. E21B 37/06
(52) U.S. Cl. ...................... 166/312; 166/300; 507/269; 507/277; 507/140; 507/145
(58) Field of Search ................................ 166/300, 311, 166/312, 282, 283; 175/72; 507/269, 277, 271, 145, 140, 239, 129

(56) References Cited

U.S. PATENT DOCUMENTS

| 5,238,065 A | 8/1993 | Mondshine et al. ........ 166/300 |
| 6,143,698 A | * 11/2000 | Murphy et al. ............. 507/145 |
| 6,300,286 B1 | * 10/2001 | Dobson, Jr. et al. ........ 507/111 |

FOREIGN PATENT DOCUMENTS

| EP | 0 672 740 | 9/1995 | ............ C09K/7/02 |
| EP | 0672740 A1 | 9/1995 | |
| EP | 1 178 099 | 2/2002 | ............ C09K/7/02 |
| WO | 01 61148 | 8/2001 | ............ E21B/37/08 |
| WO | 01 83639 | 11/2001 | ............ E21B/43/25 |

* cited by examiner

Primary Examiner—David Bagnell
Assistant Examiner—Zakiya Walker
(74) Attorney, Agent, or Firm—Robert A. Kent; C. Clark Dougherty, Jr.

(57) ABSTRACT

Well drilling and servicing fluids for use in producing formations and methods of removing filter cake therefrom are provided. The methods basically comprise using a drilling or servicing fluid basically comprised of water, a water soluble salt and a particulate solid bridging agent selected from magnesium oxychloride cement, magnesium oxysulfate cement, magnesium potassium phosphate hexahydrate, magnesium hydrogen phosphate trihydrate and magnesium ammonium phosphate hexahydrate. Thereafter, the filter cake deposited by the drilling or servicing fluid is contacted with an aqueous clean-up solution for a period of time such that the bridging agent is dissolved thereby.

24 Claims, No Drawings

WELL DRILLING AND SERVICING FLUIDS AND METHODS OF REMOVING FILTER CAKE DEPOSITED THEREBY

This Application is a Continuation-In-Part of application Ser. No. 09/629,959 filed on Aug. 1, 2000.

BACKGROUND OF THE INVENTION

1. Field of the Invention

The present invention relates to well drilling and servicing fluids utilized in producing formations and the removal of filter cake deposited by the fluids in the formations.

2. Description of the Prior Art

The use of special fluids for drilling or servicing hydrocarbon producing formations penetrated by well bores is well known. The drilling fluids are utilized when well bores are drilled into producing formations to minimize damage to the permeability of the formations and their ability to produce hydrocarbons. Servicing fluids are utilized when completion operations are conducted in producing formations and when conducting work-over operations in the formations. The drilling and servicing fluids deposit filter cake on the walls of the well bores within the producing formations which prevents the drilling and servicing fluids from being lost into the formations and prevents solids from entering the porosities of the producing formations. After the drilling or servicing of a producing formation has been completed, the filter cake is removed prior to placing the formation on production.

The removal of the filter cake from a producing formation has been accomplished in the past by including an acid soluble particulate solid bridging agent in the drilling or servicing fluid for bridging over the formation pores. The filter cake formed by the drilling or servicing fluid including the acid soluble bridging agent and a polymeric suspending agent has heretofore been contacted with a strongly acidic solution, and the acidic solution has been allowed to remain in contact with the filter cake for a period of time sufficient to dissolve the bridging particles and polymer. In spite of efforts to avoid it, the strongly acidic solution has often corroded metallic surfaces and completion equipment such as sand screens and caused their early failure. The acidic solution may have also been incompatible with the producing formation and caused damage thereto.

Water soluble particulate solid bridging agent has also been utilized in drilling or servicing fluids, and the filter cake containing the water soluble bridging agent has been contacted with an aqueous salt solution which is undersaturated with respect to the water soluble bridging particles. However, such undersaturated aqueous solutions require a relatively long period of time to dissolve the particles primarily due to the polymeric suspending agents included in the drilling or servicing fluids. That is, the polymer or polymers present in the filter cake shield the water soluble bridging particles from the aqueous solution.

In order to remove the polymeric materials in the filter cake and thereby allow the bridging agent in the filter cake to be dissolved by aqueous solutions, a metal peroxide such as an alkaline earth metal peroxide, zinc peroxide or the like has been included in the drilling and servicing fluid. The metal peroxide is deposited in the filter cake along with the bridging agent. During the filter cake removal process, a mineral acid solution is placed in contact with the filter cake which activates the metal peroxide whereby it causes polymeric materials in the filter cake to be decomposed. Thereafter, the filter cake is contacted with an under saturated aqueous solution to dissolve the filter cake. Generally, the time required for the metal peroxide and mineral acid solution to break up polymers and for the under saturated aqueous solution to dissolve the bridging agent has been relatively long making the process expensive and subjecting metal tools and parts in contact with the mineral acid solution to acid corrosion.

Thus, there are continuing needs for improved drilling and servicing fluids and methods of removing filter cake deposited by the fluids from producing formations.

SUMMARY OF THE INVENTION

The present invention provides improved well drilling and servicing fluids for use in producing formations which meet the needs described above and overcome the deficiencies of the prior art. More specifically, the present invention provides drilling and servicing fluids which include improved bridging agents having desired properties and which can be readily removed without the use of clean-up solutions containing strong mineral acids.

The drilling and servicing fluids of this invention are basically comprised of water, a water soluble salt and a particulate solid bridging agent. The particulate solid bridging agent is a synthesized inorganic compound which is dissolvable by an aqueous clean-up solution containing a mild organic acid, a hydrolyzable ester, an ammonium salt, a chelating agent, or a mixture of an ammonium salt and a chelating agent. The inorganic bridging agent is synthesized from a class of materials generally referred to as chemically bonded ceramic compounds. The synthesized inorganic bridging agent can include weighting materials to increase or decrease the density of the bridging agent as required by the well conditions and/or certain filler materials to decrease the amount of clean-up solution required. The well drilling and servicing fluid or the bridging agent therein or the clean-up solution can also include a metal peroxide or other oxidizer or breaker which functions to oxidize and break-up polymer in the filter cake deposited by the fluid.

The present invention also provides methods of removing filter cake from the walls of well bores penetrating producing formations deposited therein by drilling or servicing fluids. The methods include utilizing, as the particulate solid bridging agent in the drilling or servicing fluid, a synthesized inorganic compound which is dissolvable in an aqueous clean-up solution containing a mild organic acid, a hydrolyzable ester, an ammonium salt, a chelating agent, or a mixture of an ammonium salt and a chelating agent. The filter cake formed by the drilling or servicing fluid is contacted with the clean-up solution for a period of time such that the bridging agent is dissolved thereby. In a preferred method, the bridging agent is a chemically bonded ceramic selected from magnesium oxychloride cement, magnesium oxysulfate cement, magnesium potassium phosphate hexahydrate, magnesium hydrogen phosphate trihydrate or magnesium ammonium phosphate hexahydrate. As mentioned, the bridging agent can include weighting materials and/or certain filler materials. The drilling and servicing fluid, the bridging agent therein or the aqueous clean-up solution can also include an oxidizer or other breaker which breaks up polymer in the filter cake.

It is, therefore, a general object of the present invention to provide improved well drilling and servicing fluids for use in producing formations and methods of removing filter cake therefrom.

Other and further objects, features and advantages of the present invention will be readily apparent to those skilled in the art upon a reading of the description of preferred embodiments which follows.

DESCRIPTION OF PREFERRED EMBODIMENTS

The present invention provides improved well drilling and servicing fluids for use in producing formations which deposit filter cake that can be readily removed without the use of strong mineral acids or other hazardous chemicals. The well drilling and servicing fluids of this invention are basically comprised of water, a water soluble salt and a particulate solid bridging agent. The particulate solid bridging agent is a synthesized inorganic compound of the type generally referred to as a chemically bonded ceramic. The particulate solid bridging agent is soluble in an aqueous clean-up solution containing a mild organic acid, a hydrolyzable ester, an ammonium salt, a chelating agent or a mixture of an ammonium salt and a chelating agent. When required, a fluid loss control agent and/or a hydratable polymer solids suspending agent can optionally be included in the well drilling and servicing fluids.

The water soluble salt in the drilling and servicing fluids of this invention can be one or more of sodium chloride, sodium bromide, sodium acetate, sodium formate, sodium citrate, potassium chloride, potassium formate, cesium formate, calcium chloride, calcium bromide and mixtures thereof. Common oilfield brines can be utilized in the drilling and servicing fluids in place of water and a water soluble salt. Oilfield brines are often preferred due to their ready availability in the oilfield.

A variety of fluid loss control agents can be utilized in the well drilling or servicing fluids, including, but not limited to, starch, starch ether derivatives, hydroxyethylcellulose, cross-linked hydroxyethylcellulose and mixtures thereof. Of these, starch is the most preferred. When used, the fluid loss control agent is generally included in the salt solution or brine in an amount in the range of from about 0.1% to about 2% by weight of the salt solution or brine, more preferably in the range of from about 1% to about 1.3% and most preferably about 1.3%.

A variety of hydratable polymer solid suspending agents can also be utilized, including, but not limited to, biopolymers such as xanthan and succinoglycon, cellulose derivatives such as hydroxyethylcellulose and guar and its derivatives such as hydroxypropyl guar. Of these, xanthan is preferred. When used, the hydratable polymer is generally included in the drilling or servicing fluid in an amount in the range of from about 0.1% to about 0.6% by weight of the salt solution or brine, more preferably in the range of from about 0.13% to about 0.16% and most preferably about 0.13%.

In accordance with this invention, the particulate solid bridging agents are synthesized inorganic compounds of the type generally referred to as chemically bounded ceramics that are substantially insoluble in water, but are substantially soluble in the aqueous clean-up solution used. Examples of such chemically bounded ceramics include, but are not limited to, magnesium oxychloride cement, magnesium oxysulfate cement, magnesium hydrogen phosphate trihydrate, magnesium potassium phosphate hexahydrate and magnesium ammonium phosphate hexahydrate.

Magnesium oxychloride cement is prepared by mixing magnesium oxide, magnesium chloride and water. Magnesium oxysulfate is prepared by mixing magnesium oxide, magnesium sulfate and water. Magnesium hydrogen phosphate trihydrate is prepared by mixing magnesium oxide, phosphoric acid and water. Magnesium potassium phosphate hexahydrate is prepared by mixing magnesium oxide, monopotassium phosphate and water. Magnesium ammonium phosphate is prepared by mixing magnesium oxide, monoammonium phosphate and water.

Other materials can be added to the ceramic compounds described above to achieve desired results or properties. For example, particulate weighting materials such as barite, iron oxide and manganese oxide can be included therein. As mentioned above, oxidizers and other polymer breakers can also be included. Many other useful additives will suggest themselves to those skilled in the art.

The bridging agent utilized in the drilling or servicing fluid is generally included therein in the amount of from about 5% to about 60% by weight of the aqueous salt solution or brine, more preferably in the range of from about 10% to about 27% and most preferably about 14%.

As will be understood by those skilled in the art, the particulate solid bridging agent is deposited by the drilling or servicing fluid on the walls of the well bore in the producing zone being drilled or serviced along with other solid particles and gelled fluid loss control polymers, suspending agent polymers and the like. Upon completion of the drilling or servicing operation, an aqueous clean-up solution containing a mild organic acid, a hydrolyzable ester, an ammonium salt, a chelating agent or a mixture of an ammonium salt and a chelating agent is introduced into the well bore whereby the particulate solid bridging agent in the filter cake is dissolved.

The well drilling and servicing fluid or the bridging agent therein or the clean-up solution can contain an oxidizer or other breaker which functions to oxidize and break up gelled polymeric fluid loss control additives, suspending agents and the like in the filter cake. The breaking up of the polymeric materials allows the particulate solid bridging agent to be dissolved by the clean-up solution in a shorter period of time. Generally, any oxidizer or other breaker that can be deposited with the filter cake and is substantially inactive until contacted with an aqueous clean-up solution can be utilized in the well drilling and servicing fluid or in the bridging agent. For example, oxidizers that are substantially insoluble in water but are soluble in the clean-up solution can be utilized. Oxidizers or other breakers that can be encapsulated with a material that is insoluble in water but soluble in the clean-up solution or that can be encapsulated in the bridging agent can also be used.

Various oxidizers and breakers that can be incorporated into the particulate solid bridging agent when it is prepared include, but are not limited to, hydrogen peroxide, ammonium persulfate, sodium persulfate, potassium permanganate, sodium bromate, sodium perforate, potassium iodate, potassium periodate, sodium chlorite, sodium hypochlorite, lithium hypochlorite, calcium hypochlorite, xanthanse enzymes and amylase enzymes.

Various substantially insoluble oxidizers and breakers that can be utilized in the drilling or servicing fluid, include, but are not limited to, magnesium peroxide, magnesium peroxydiphosphate, strontium peroxide, barium peroxide, calcium peroxide, magnesium perborate, barium bromate and mixtures thereof.

The oxidizer or breaker utilized is generally included in the drilling or servicing fluid in an amount in the range of from about 0.1% to about 6% by weight of the aqueous salt solution or brine, more preferably in the range of from about 0.3% to about 3% and most preferably about 0.3%.

As mentioned above, the aqueous clean-up solution can contain a mild organic acid. Examples of suitable such acids include, but are not limited to, acetic acid, citric acid, adipic acid, succinic acid and glutaric acid. When used, the mild organic acid is generally included in the aqueous clean-up solution in an amount in the range of from about 0.1% to about 5% by weight of the solution, more preferably from about 0.5% to about 2% and most preferably from about 1% to about 1.5%.

Examples of hydrolyzable esters that can be used include, but are not limited to, triethyl citrate, dimethyl glutarate, dimethyl succinate and dimethyl adipate. When used, the hydrolyzable ester is generally included in the aqueous clean-up solution in an amount in the range of from about 0.1% to about 20% by weight of the solution, more preferably from about 0.5% to about 5% and most preferably from about 1% to about 3%.

The ammonium salt utilized in the aqueous clean-up solution can be one or more ammonium salts having the following formula:

$$R_n NH_{4-n} X$$

wherein R is an alkyl group having from 1 to 6 carbon atoms, n is an integer from 0 to 3 and X is an anionic radical selected from halogens, nitrate, citrate, acetate, sulfate, phosphate and hydrogen sulfate.

Examples of suitable such ammonium salts include, but are not limited to, ammonium chloride, ammonium bromide, ammonium nitrate, dibasic ammonium citrate, ammonium acetate and mixtures thereof. The ammonium salt utilized is generally included in the clean-up solution in an amount in the range of from about 3% to about 25% by weight of water therein, more preferably in the range of from about 5% to about 14% and most preferably about 5%.

A variety of chelating agents can be utilized in the aqueous clean-up solution to dissolve the bridging agents described above. The term "chelating agent" is used herein to mean a chemical that will form a water-soluble complex with the cationic portion of the bridging agent to be dissolved. Various chelating agents can be utilized including, but not limited to, ethylenediaminetetraacetic acid (EDTA) and salts thereof, nitrilotriacetic acid (NTA) and salts thereof, diethylenetriaminepentaacetic acid (DTPA) and salts thereof, trans-1,2-diaminocyclohexane-N,N,N',N'-tetraacetic acid (DCTA) and salts thereof, citric acid and salts thereof, diglycolic acid and salts thereof, phosphonic acid and salts thereof, aspartic acid and its polymers and mixtures thereof. The chelating agent utilized is generally included in the aqueous clean-up solution in an amount in the range of from about 0.1% to about 40% by weight of the solution, more preferably in the range of from about 5% to about 20% and most preferably about 20%. The clean-up solution can also optionally include one or more of the oxidizers or other breakers described above for oxidizing and breaking up polymeric materials in the filter cake.

As mentioned above, the ammonium salts and chelating agents can be utilized alone or together depending on the particular bridging agent used. As also mentioned above, after the drilling or servicing of a producing formation has been completed, the clean-up solution is introduced into the producing formation into contact with the filter cake deposited therein. The clean-up solution is allowed to remain in contact with the filter cake for a period of time sufficient for gelled polymer in the filter cake to be broken up and the bridging agent to be dissolved. Thereafter, the formation can be produced to remove the remaining filter cake.

If necessary, a suitable wash solution can be circulated through the well bore in the producing formation to wash remaining filter cake from the walls of the well bore. Generally, the wash solution utilized should be an aqueous solution which does not adversely affect the permeability of the hydrocarbon containing producing formation. Thus, the wash solution can be an aqueous solution containing one or more salts which inhibit the swelling and/or dispersion of particles within the formation such as potassium chloride, sodium chloride, ammonium chloride and tetramethyl ammonium chloride. Of the above salts, ammonium chloride is preferred.

The ammonium salt, chelating agent or mixture of ammonium salt and chelating agent utilized in the clean-up solution can be delivered in solution as described above or they can be encapsulated to delay the dissolution of the bridging solids until the clean-up of the filter cake is desired. Another similar technique is to generate the salt and/or agent in-situ.

A delayed break of the filter cake can also be achieved by utilizing a chelating agent that does not dissolve the bridging agent particles out of the presence of an ammonium salt or salts. The chelating agent can be included in the drilling or servicing fluid and the ammonium salt utilized can be delivered in encapsulated form or generated in-situ. Various other techniques known to those skilled in the art for providing delays can also be utilized such as delivering the chelating agent as an ester that slowly hydrolyzes to the acid chelating form, utilizing a chelating agent that is not effective at a particular pH and introducing a second agent to change the pH to a level where the chelating solution dissolves bridging particles, and other similar variations.

In accordance with the methods of this invention, filter cake is removed from the walls of a well bore penetrating a producing formation. The filter cake is deposited in the well bore by a drilling or servicing fluid of this invention basically comprised of water, a water soluble salt and a particulate solid bridging agent. The methods are basically comprised of the following steps. The particulate solid bridging agent utilized in the drilling or servicing fluid is a synthetic inorganic compound which dissolves in an aqueous clean-up solution containing a mild organic acid, a hydrolyzable ester, an ammonium salt, a chelating agent, or a mixture of an ammonium salt and a chelating agent. After the drilling or servicing fluid is removed from the well bore, the filter cake remaining on the walls of the well bore including the bridging agent is contacted with the clean-up solution used for a period of time such that the bridging agent is dissolved thereby. As mentioned above, the drilling or servicing fluid can include a fluid loss control agent and a polymeric solids suspension agent. As also mentioned above, the drilling or servicing fluid, the bridging agent therein or the aqueous clean-up solution can include an oxidizer or other breaker which oxidizes and breaks up gelled polymer in the filter cake. Also, as mentioned above, after the clean-up solution breaks up gelled polymer in the filter cake and dissolves the bridging agent therein, a wash solution can be utilized to remove the remaining filter cake from the walls of the well bore or the remaining filter cake can be removed by producing the formation.

A particularly suitable method of this invention for removing filter cake from the walls of a well bore penetrating a producing formation deposited therein by a drilling or servicing fluid is comprised of the following steps. A drilling or servicing fluid is utilized comprised of water, a water soluble salt selected from the group consisting of sodium chloride, sodium bromide, sodium acetate, sodium formate, sodium citrate, potassium chloride, potassium formate, cesium formate, calcium chloride, calcium bromide and mixtures thereof or one or more brines containing such salts, a fluid loss control agent comprised of starch, a xanthan polymer solids suspending agent and a particulate solid chemically bonded ceramic bridging agent selected from magnesium oxychloride cement, magnesium oxysulfate cement, magnesium potassium phosphate hexahydrate, magnesium hydrogen phosphate trihydrate or magnesium ammonium phosphate hexahydrate, and a particulate solid magnesium peroxide oxidizing agent which is activated by contact with an ammonium salt to oxidize and break up gelled polymer in the filter cake. Thereafter, the filter cake produced by the drilling or servicing fluid is contacted with an aqueous clean-up solution containing ammonium chloride, a chelating agent or ammonium chloride and a chelating agent for a time period such that gelled polymer in the filter cake is oxidized and broken up by the magnesium peroxide and the bridging agent is dissolved by the clean-up solution. If required, a wash solution can next be utilized to contact the walls of the well bore and wash away any remaining filter cake thereon or the remaining filter cake can be removed by producing the formation. As mentioned above, various components of the drilling or servicing fluid and/or the cleaning solution can be delivered to the producing formation in encapsulated form or generated in-situ.

In order to further illustrate the drilling and servicing fluids and methods of this invention, the following examples are given.

EXAMPLE 1

Horizontal wells are often completed utilizing servicing fluids which include particulate solid bridging agents that are deposited as a part of the filter cake on the walls of the well bores. The wells are completed by placing gravel packs in the producing zones and clean-up solutions are placed in the gravel packs and left to soak so that the filter cake is dissolved and removed. In a typical horizontal well completed with a gravel pack in an 8½" diameter well bore with 5½" diameter screens, the solubility of the bridging particles in the filter cake should be in the range of from about 0.5 to about 1.25 cubic centimeters of bridging particles per 100 cubic centimeters of clean-up solution. For bridging particles with specific gravities of greater than about 0.6, this means that about 1.5 to about 3 grams of bridging agent will be dissolved per 100 cubic centimeters of clean-up solution.

A procedure for testing clean-up solutions for dissolving various particulate bridging agent was developed as follows: 0.5 cubic centimeters of the particulate bridging agent tested are added to a 50 milliliter vial. The vial is then filled with clean-up solution, capped and placed in a 150° water bath for 24 hours. Thereafter, the solids in the vial are filtered using a preweighed filter. The filter with the solids thereon is dried and weighed to determine the weight of the undissolved solids. The solubility of the particulate bridging agent is then calculated in percent of solids dissolved.

Several bridging agents and clean-up solutions were tested using the above described procedure, and the results of the testing are given in Table I below.

TABLE I

Dissolution Of Particulate Solid
Bridging Agents With Ammonium Salt Solutions

| Particulate Bridging Agent | Aqueous Ammonium Salt Clean-Up Solution | Solubility, % Dissolved |
|---|---|---|
| Magnesium Oxychloride | 4 M Ammonium Chloride | 99.2 |
| Magnesium Oxysulfate | 4 M Ammonium Chloride | 99.6 |

EXAMPLE 2

Wells are often cleaned up using a post-gravel pack treatment under dynamic conditions. A variety of clean-up solutions were prepared in the laboratory containing water and ammonium chloride or a chelating agent or both ammonium chloride and a chelating agent. The clean-up solutions were neutralized to a pH of 7 with a 50% by weight sodium hydroxide solution. 50 milliliters of each clean-up solution were combined with 1 gram amounts of particulate magnesium potassium phosphate and the resulting mixtures were observed while being stirred with heat to determine if the magnesium potassium phosphate was dissolved. The clean-up solution components and their quantities as well as the results of the tests are given in Table II below.

TABLE II

Solubility Of Magnesium Potassium Phosphate
In Various Clean-Up Solutions

| | Clean-Up Solution | | | |
|---|---|---|---|---|
| No. | Water ml | Ammonium Chloride, grams | Chelating Agent Used/grams | Observations |
| 1 | 50 | 8 | DTPA[1]/3.1 | Dissolved in 45 minutes |
| 2 | 50 | 8 | DCTA[2]/2.6 | Dissolved in 10 minutes |
| 3 | 50 | none | DTPA[1]/3.1 | Dissolved in 30 minutes |
| 4 | 50 | none | DCTA[2]/2.6 | Dissolved in 30 minutes |
| 5 | 50 | 8 | EDTA Salt[3]/2.5 | Dissolved in 3 minutes |
| 6 | 50 | none | EDTA Salt[4]/2.8 | Dissolved in 3 minutes |
| 7 | 50 | none | NTA[5]/1.5 | Dissolved in 3 minutes |
| 8 | 50 | none | NTA Salt[6]/2.1 | Dissolved in 20 minutes |

[1]Diethylenetriaminepentaacetic acid
[2]Trans-1,2-diaminocyclohexane-N,N,N',N'-tetraacetic acid
[3]Diammonium ethylenediaminetetraacetate
[4]Disodium ethylenediaminetetraacetate
[5]Nitrilotriacetic acid
[6]Trisodium nitrilotriacetate From Table II it can be seen that the various clean-up solutions readily dissolve particulate magnesium potassium phosphate.

EXAMPLE 3

A number of aqueous clean-up solutions containing various hydrolyzable esters and a chelating agent were prepared. 50 milliliter portions of the clean-up solutions were placed in contact with 1 gram of magnesium potassium phosphate ($MgKPO_4 \cdot H_2O$) and the times required for the magnesium potassium phosphate to dissolve were determined. The clean-up solution components and their quantities as well as the results of the tests are given in Table III below.

TABLE III

Solubility Of Magnesium Potassium Phosphate
In Additional Clean-Up Solutions

| | Clean-Up Solution | | |
|---|---|---|---|
| No. | Water, m/s | Ester | Chelating Agent | Observation |
| 1 | 50 | 2 g triethyl citrate | 4.4 g sodium citrate | Dissolved in 24 hrs |
| 2 | 50 | 3 g dimethyl phthalate | 4.4 g sodium citrate | Dissolved in 48 hrs |
| 3 | 50 | 2.6 g dimethyl glutarate | 4.4 g sodium citrate | Dissolved in 48 hrs |
| 4 | 50 | 3 g DBE[1] | 4.4 g sodium citrate | Dissolved in 72 hrs |

[1]DBE (dibasic esters) is a mixture of dimethylglutarate, dimethyl succinate and dimethyl adipate.

From Table III, it can be seen that the clean-up solutions dissolved the magnesium potassium phosphate.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. A method of removing filter cake from the walls of a well bore penetrating a producing formation deposited therein by a drilling or servicing fluid comprised of water, a water soluble salt and a particulate solid bridging agent comprising the steps of:
    (a) utilizing as the particulate solid bridging agent in said drilling or servicing fluid a chemically bonded ceramic selected from the group consisting of magnesium oxychloride cement, magnesium oxysulfide cement, magnesium potassium phosphate hexahydrate, magnesium hydrogen phosphate trihydrate and magnesium ammonium phosphate hexahydrate which is dissolvable in an aqueous clean-up solution containing a mild organic acid, a hydrolyzable ester, an ammonium salt and one of a chelating agent and an ammonium salt and a chelating agent; and
    (b) contacting said filter cake with said clean-up solution for a period of time such that said bridging agent is dissolved thereby.

2. The method of claim 1 wherein said bridging agent is comprised of magnesium oxychloride cement.

3. The method of claim 1 wherein said bridging agent includes an oxidizer or other breaker encapsulated therein for breaking up polymer in said filter cake deposited by said fluid.

4. The method of claim 3 wherein said oxidizer or other breaker is selected from the group consisting of magnesium peroxide, magnesium peroxydiphosphate, strontium peroxide, barium peroxide, calcium peroxide, magnesium perborate, barium bromate and mixtures thereof.

5. The method of claim 1 wherein said drilling or servicing fluid further comprises an oxidizer or other breaker for breaking up polymer in said filter cake which is activated by said clean-up solution.

6. The method of claim 5 wherein said oxidizer or other breaker is selected from the group consisting of magnesium peroxide, magnesium peroxydiphosphate, strontium peroxide, barium peroxide, calcium peroxide, magnesium perborate, barium bromate and mixtures thereof.

7. The method of claim 5 wherein said oxidizer or other breaker is magnesium peroxide.

8. The method of claim 1 wherein said water soluble salt in said drilling or servicing fluid is selected from the group consisting of sodium chloride, sodium bromide, sodium acetate, sodium formate, sodium citrate, potassium chloride, potassium formate, cesium formate, calcium chloride, calcium bromide and mixtures thereof.

9. The method of claim 1 wherein clean-up solution contains a mild organic acid selected from the group consisting of acetic acid, citric acid, adipic acid and glutaric acid.

10. The method of claim 1 wherein said clean-up solution contains a hydrolyzable ester selected from the group consisting of triethyl citrate, dimethyl glutarate, dimethyl succinate and dimethyl adipate.

11. The method of claim 1 wherein said clean-up solution contains an ammonium salt and said ammonium salt has the formula $$R_n NH_{4-n} X$$

wherein R is an alkyl radical having from 1 to 6 carbon atoms, n is an integer from 0 to 3 and X is an anionic radical selected from halogens, nitrate, citrate, acetate, sulfate, phosphate and hydrogen sulfate.

12. The method of claim 1 wherein said clean-up solution contains an ammonium salt and said ammonium salt is selected from the group consisting of ammonium chloride, ammonium bromide, ammonium nitrate, ammonium citrate, ammonium acetate and mixtures thereof.

13. The method of claim 1 wherein said clean-up solution contains an ammonium salt and said ammonium salt is ammonium chloride.

14. The method of claim 1 wherein said clean-up solution contains a chelating agent and said chelating agent is selected from the group consisting of ethylenediaminetetraacetic acid and salts thereof, nitrilotriacetic acid and salts thereof, diethylenetriaminepentaacetic acid and salts thereof, trans-1,2-diaminocyclohexane-N,N,N',N'-tetraacetic acid and salts thereof, citric acid and salts thereof, diglycolic acid and salts thereof, phosphoric acid and salts thereof, aspartic acid and its polymers and mixtures thereof.

15. The method of claim 1 wherein said chelating agent is ethylenediaminetetraacetic acid and salts thereof.

16. A method of removing filter cake from the walls of a well bore penetrating a producing formation deposited therein by a drilling or servicing fluid comprising the steps of:
    (a) using as the drilling or servicing fluid, a fluid comprised of water, a water soluble salt selected from the group consisting of sodium chloride, sodium bromide, potassium chloride, calcium chloride, calcium bromide and mixtures thereof, a fluid loss control agent comprised of starch, a hydratable polymer solids suspending agent comprised of xanthan and a particulate solid bridging agent selected from the group consisting of magnesium oxychloride cement, magnesium oxysulfide cement, magnesium potassium phosphate hexahydrate, magnesium hydrogen phosphate trihydrate, and magnesium ammonium phosphate hexahydrate which is soluble in an aqueous clean-up solution containing a mild organic acid, a hydrolyzable ester, an ammonium salt and one of a chelating agent and an ammonium salt and a chelating agent; and
    (b) contacting said filter cake with said clean-up solution for a period of time such that said bridging agent is dissolved thereby.

17. The method of claim 16 wherein said bridging agent is comprised of magnesium oxychloride cement.

18. The method of claim 16 wherein said bridging agent includes an oxidizer or other breaker encapsulated therein for breaking up polymer in said filter cake deposited by said fluid.

19. The method of claim 18 wherein said oxidizer or other breaker is selected from the group consisting of magnesium peroxide, magnesium peroxydiphosphate, strontium peroxide, barium peroxide, calcium peroxide, magnesium perborate, barium bromate and mixtures thereof.

20. The method of claim 16 wherein said drilling or servicing fluid further comprises an oxidizer or other breaker for breaking up polymer in said filter cake which is activated by said clean-up solution.

21. The method of claim 20 wherein said oxidizer or other breaker is selected from the group consisting of magnesium peroxide, magnesium peroxydiphosphate, strontium peroxide, barium peroxide, calcium peroxide, magnesium perborate, barium bromate and mixtures thereof.

22. The method of claim 20 wherein said oxidizer or other breaker is magnesium peroxide.

23. The method of claim 16 wherein said clean-up solution contains an ammonium salt and one of a chelating agent and an ammonium salt and a chelating agent, and said animonium salt is ammonium chloride.

24. The method of claim 23 wherein said chelating agent is ethylenediaminetetraacetic acid and salts thereof.

* * * * *